United States Patent [19]
Rudder et al.

[11] 3,948,466
[45] Apr. 6, 1976

[54] PNEUMATIC CARRIER SEND AND RECEIVE TERMINAL

[75] Inventors: Joel Rudder, Rockaway; Stanley Arasim, Jr., Newfoundland; Victor Vogel, Oakridge, all of N.J.

[73] Assignee: Mosler Safe Company, Hamilton, Ohio

[22] Filed: Dec. 26, 1974

[21] Appl. No.: 536,455

[52] U.S. Cl. .......................... 243/24; 243/7; 243/19; 243/38
[51] Int. Cl.² .......................................... B65G 51/32
[58] Field of Search ............... 243/1, 7, 8, 9, 10, 11, 243/12, 4, 19, 20, 23, 24, 25, 28, 38

[56] References Cited
UNITED STATES PATENTS

| | | | |
|---|---|---|---|
| 3,053,475 | 9/1962 | Tonne | 243/16 R |
| 3,282,531 | 11/1966 | Stewart | 243/19 X |
| 3,610,554 | 10/1971 | Schwarz | 243/19 |
| 3,659,809 | 5/1972 | Cook | 243/19 |
| 3,790,102 | 2/1974 | Tearne | 243/19 |

Primary Examiner—Evon C. Blunk
Assistant Examiner—James L. Rowland
Attorney, Agent, or Firm—Wood, Herron & Evans

[57] ABSTRACT

A pneumatic carrier terminal in a preferred embodiment includes a movable horizontal tray alignable with a horizontal pneumatic tube connected to the terminal. A carrier sealing ring is provided on the end of the tray and is aligned with the tube. The trailing end of a received carrier resides in the ring which surrounds the carrier's gasket. Stationary, two-stage cam apparatus within the terminal engages and pushes a carrier out of the ring when the tray is moved out of the terminal to present the carrier. Other stationary cam apparatus within the terminal engages and pushes a carrier into the ring when the carrier is replaced and the tray is retracted from the presentment position. The ring operatively seals one end of the carrier to the pneumatic tube to positively insure carrier flight when the terminal is pressurized. Alternate cam apparatus is disclosed.

30 Claims, 14 Drawing Figures

U.S. Patent  April 6, 1976  Sheet 1 of 3  3,948,466
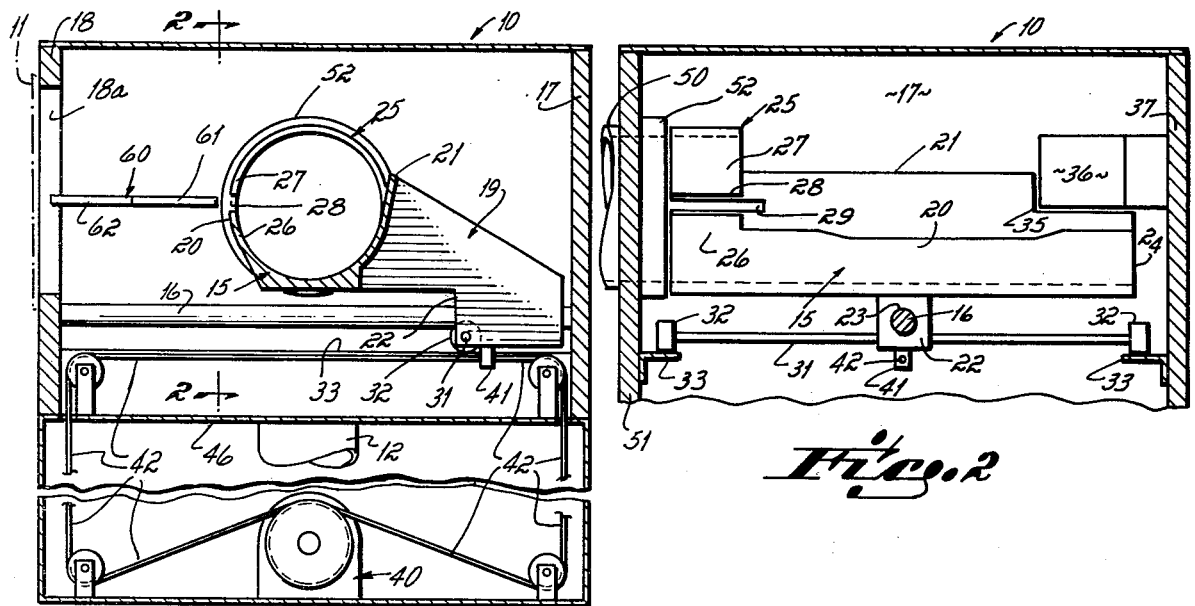
Fig.1
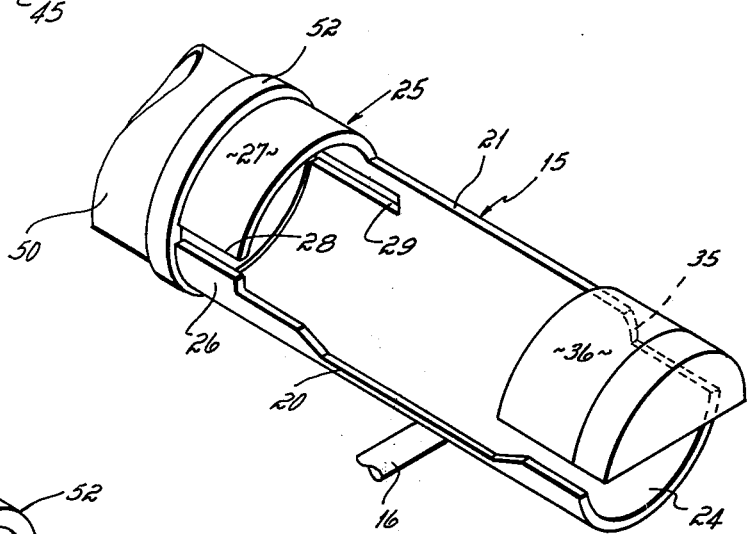
Fig.2
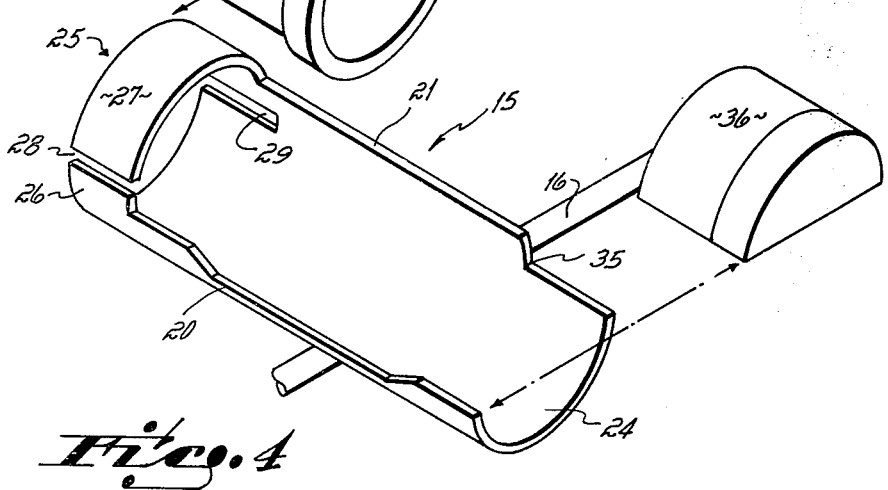
Fig.3
Fig.4

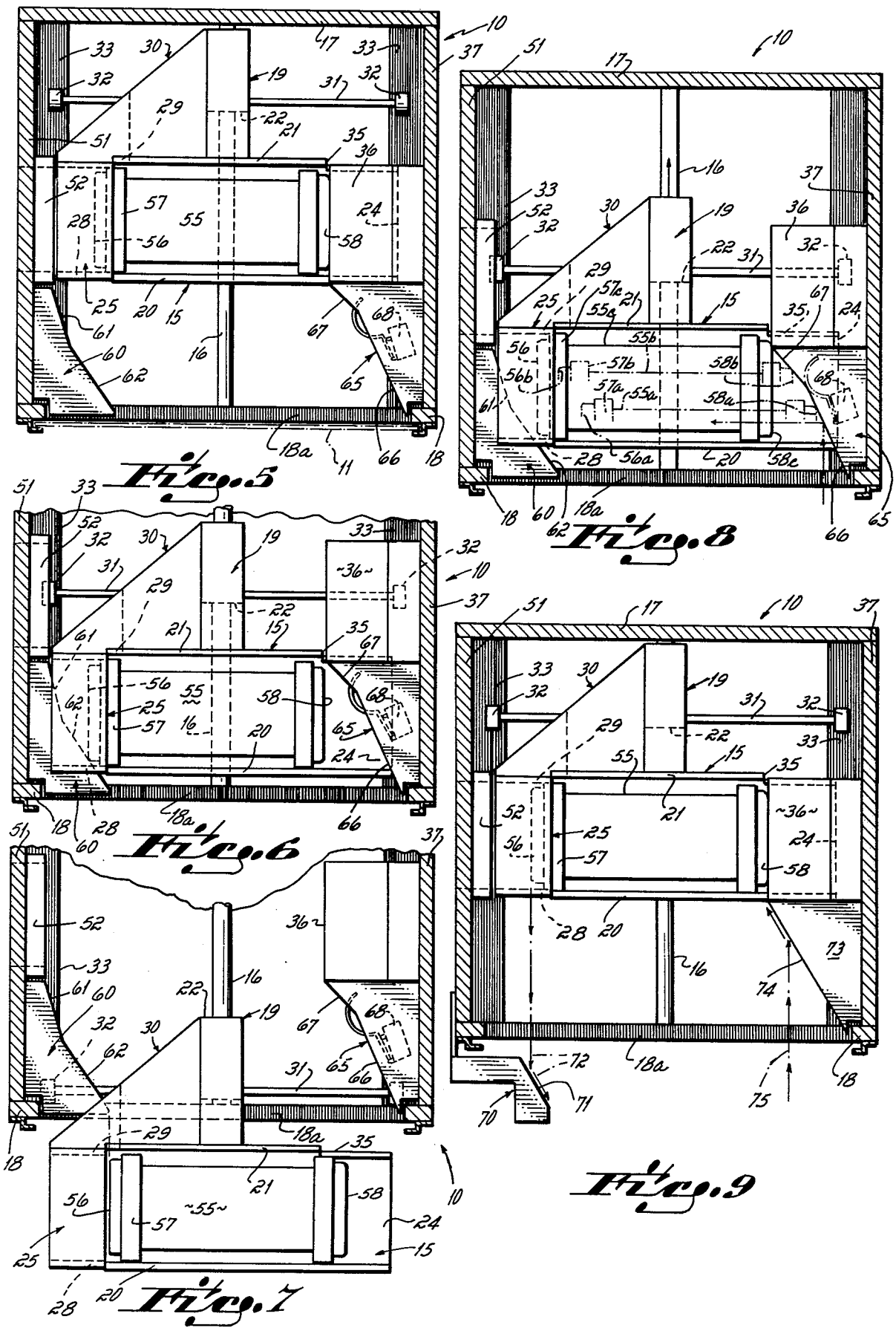

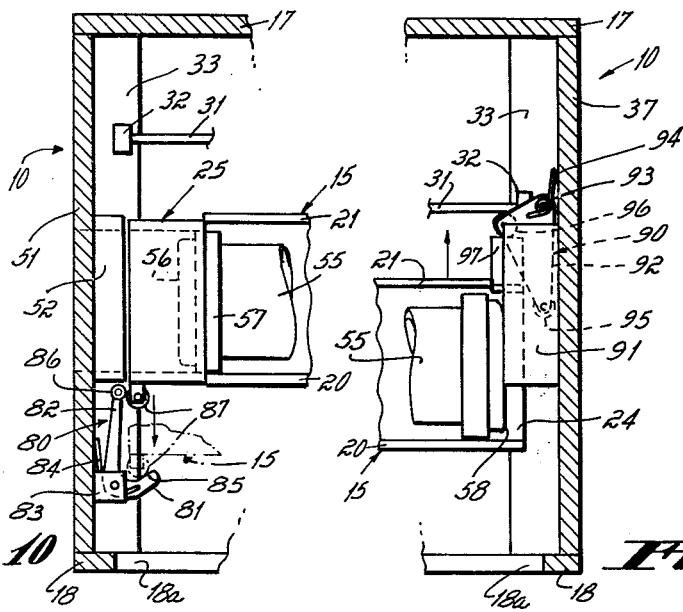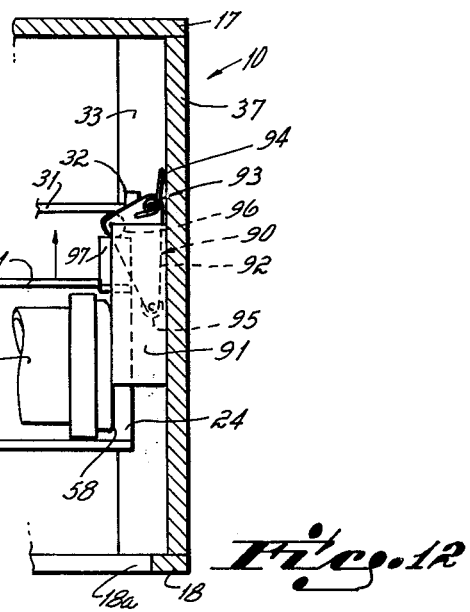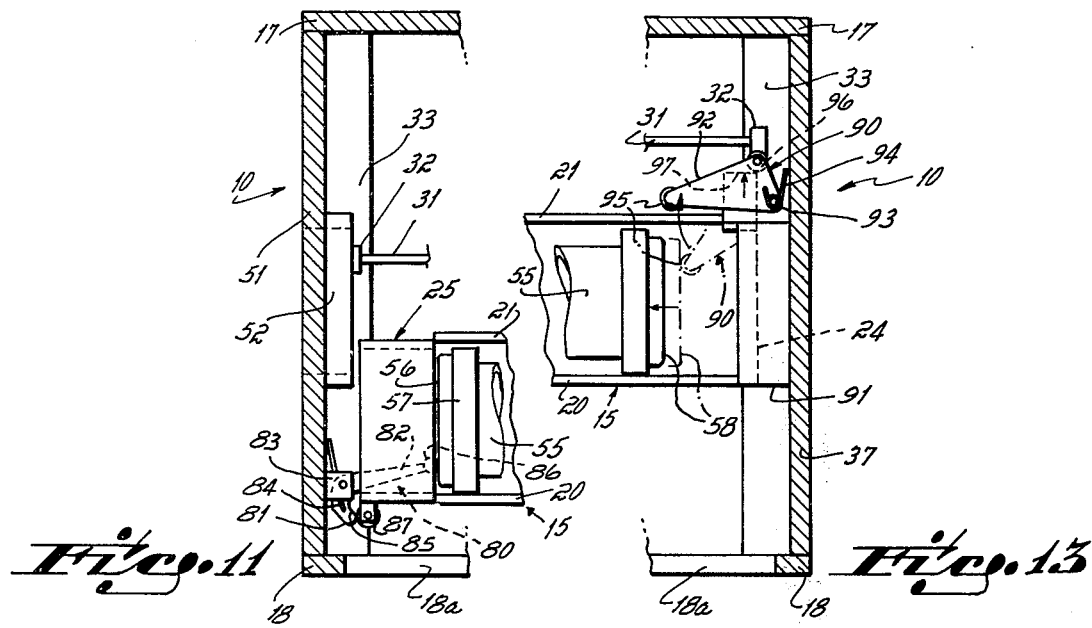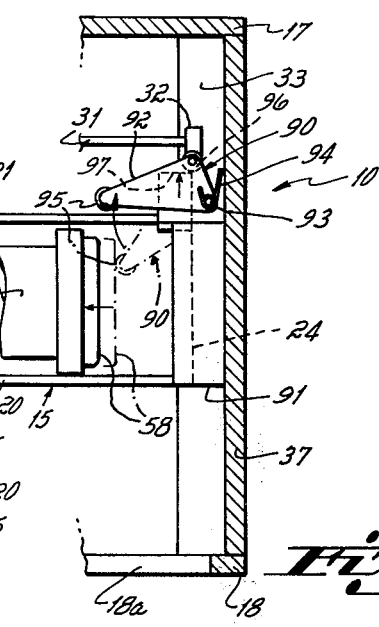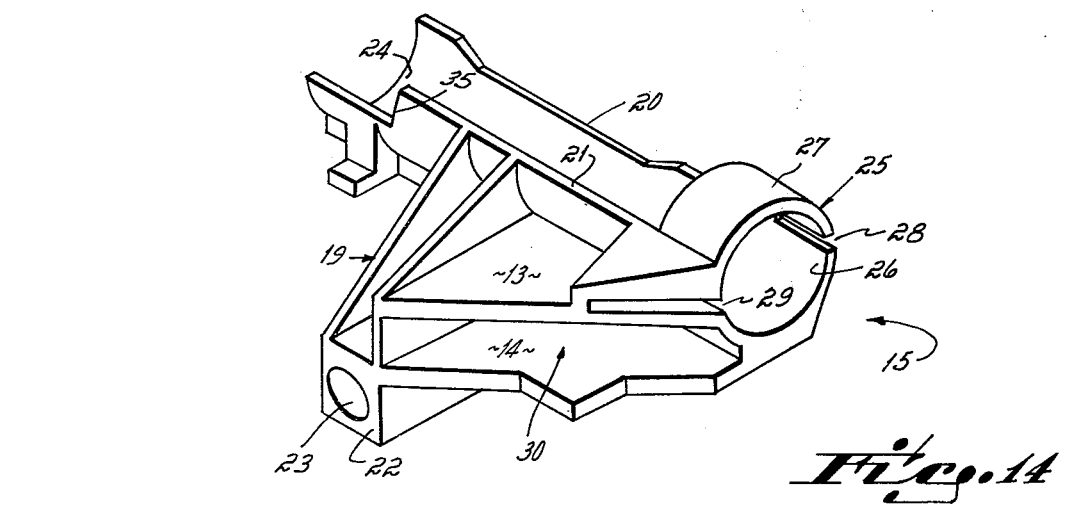

PNEUMATIC CARRIER SEND AND RECEIVE TERMINAL

This invention relates to terminals for pneumatic tube conveyors and more particularly to terminal apparatus for receiving, for presenting for removal, and for dispatching pneumatic carriers.

While the pneumatic transportation of article carriers is a relatively old concept, there has recently been an increased interest in the art, particularly with respect to the use of such transport systems in the banking field. The transport systems are particularly useful in the "drive-in" bank where a customer never leaves his car but rather transacts deposits, withdrawals and the like via a pneumatic transport system.

Such transport systems normally require actual operation by the customer in removing a carrier from the terminal, in filling a carrier, and then in returning the carrier to the system for transmission to the teller. From a hazard standpoint, and from an efficient operational standpoint, it is thus desirable to provide a pneumatic terminal for customer use wherein any required manipulation by a customer is very simple and does not require any particular handling skills or training to insure positive operation of the transport system, nor does it require a customer to extend his hand or arm into the terminal where it might be caught or injured by the apparatus.

In order to facilitate customer handling of a carrier and carrier removal from and introduction to a customer terminal, it is advantageous to receive carriers in a horizontal tray within a closed terminal and to move the tray toward or through a door of the terminal to present the carrier to a customer outwardly of the terminal. The carrier can then be removed, filled or emptied, and replaced on the tray. The tray is then automatically moved to a position within the terminal, the terminal door closing, and the carrier dispatched to the teller through a pneumatic tube.

While such automatic presentment and withdrawal of carriers greatly facilitates a customer's efficient participation in this form of banking system, it nevertheless presents a problem in terminal design since it is necessary to insure establishment of a pressure differential across a carrier so that the carrier will positively take flight from the tray into the pneumatic tube when the blower or suction system of the apparatus is operated. In this respect, such terminals differ substantially from those of the type wherein an operator manually inserts a carrier directly into a pneumatic tube of the system, or wherein a carrier is lifted or dropped into a pneumatic tube. For example, in the apparatus described above, and upon return of the horizontal tray to a position within the terminal, the carrier still rests thereon and is not inserted into a pneumatic tube. Even if the terminal is pressurized, the pressure across the carrier is equalized and it is not in a condition to positively take flight.

It has thus been a primary objective of the invention to provide a pneumatic terminal having improved means for receiving a pneumatic carrier from a pneumatic transport tube, for moving the carrier from a receiving position to an unencumbered presentment position where the carrier can be simply grasped and removed, and for returning a carrier from the presentment position, after it has been filled or emptied, to a dispatching position wherein the carrier is correctly disposed for positive movement into the pneumatic tube upon application of the proper pneumatic forces, all without direct carrier or apparatus manipulation by an operator.

A further objective of the invention has been to provide a pneumaic terminal with a movable tray for receiving a carrier for presenting a carrier for removal, and for operatively sealing a carrier on the tray to a pneumatic tube for positive dispatch.

A further objective of the invention has been to provide a pneumatic terminal having a receiving-dispatching tray with means for surrounding and operatively sealing an end of the carrier to a pneumatic tube outlet in the terminal, and with means for respectively disengaging and engaging the carrier from and with the sealing means in direct response to movement of the tray from a receiving position to a carrier presentment position, and from the presentment position to a dispatching position, respectively.

A related and highly important further objective has been to provide alternate means for disengaging and engaging a carrier respectively from and with the surrounding sealing means, all without actual carrier manipulation by an operator.

In accordance with the invention, a preferred embodiment thereof includes a pneumatic terminal connected to a pneumatic tube at a tube outlet, a movable tray aligned with the outlet in a receiving-dispatching position for receiving a carrier from the tube and for operatively positioning a carrier for dispatch, a ring at one end of the tray near the outlet for surrounding one end of a carrier and for providing a seal between the carrier and the outlet to insure movement of the carrier into the tube when the terminal is pressurized, and means for respectively disengaging and engaging carriers from and with said ring indirect response to respective movement of the tray from the receiving-dispatching position to a presentment position and from the presentment position to the receiving-dispatching position.

Several alternate means for respectively disengaging and engaging the carrier with respect to the ring are provided. In one embodiment, a stationary cam is mounted on the terminal just outwardly of the terminal door and a cam receiving slot is provided in the ring. When the tray is moved outwardly, the cam engages the carrier through the slot and moves it in an axial direction away from the ring. The carrier is thus presented by the tray in an unencumbered position for easy grasping and removal. A second stationary cam is mounted within the terminal near another end of the tray and, as the tray is moved inwardly, one end of the carrier thereon is engaged by this cam and the other end is moved axially into the ring. When the tray stops at the dispatching position, the ring operatively seals one end of the carrier to the tube outlet and the carrier is thus positively positioned for dispatch when the terminal is pressurized.

In order to stop the moving carrier on the tray upon its receipt from the pneumatic tube, a carrier stop or bumper is mounted within the terminal near an end of the tray opposite the ring. In a "received" position, one end of the carrier abuts or is adjacent the stop and the other end is disposed within the ring. The carrier cannot be moved out of the ring until its far end clears the stop as the tray is moved outwardly. The first cam is thus mounted outwardly of the terminal so that its engagement with the carrier is delayed until the tray moves sufficiently to clear the stop.

While this particular embodiment provides the necessary movement, both to disengage the carrier from the ring and to insert the carrier into the ring, the invention also contemplates an improved cam apparatus wherein two rotary cams are rotationally mounted within the terminal, without requiring any increase in the front-to-back terminal dimension and without resulting in undesired movement of the carrier against an inoperative cam or a carrier stop within the terminal.

The invention contemplates, then, in this improved alternate embodiment, modified cams for moving the carrier out of and into the tray ring, wherein two cams are rotationally mounted within the terminal and it is unnecessary to mount a protruding cam element on the outside thereof. In this embodiment, a first rotary cam includes a bell crank pivoted near the path traversed by the tray. The crank has one curved arm disposed within a path of a roller mounted on the tray, and another arm disposed to pass through the ring, engage the carrier, and push it out of the ring when the first arm is engaged and rotated about the pivot by the tray mounted roller. The crank is spring loaded so that it is biased to a withdrawn, inoperative position when the tray is in its receiving-dispatching position.

In another aspect of this embodiment, a second pivoted cam can be utilized to move the carrier back into the ring as the tray is returned to its receiving-dipatching position. The second cam includes a bell crank also pivoted near the path traversed by the tray, but is nearer the end of the tray opposite to that on which the ring is mounted. This bell crank has two arms, a first one disposed in the path of a tray mounted abutment and the other disposed to engage the carrier and to push the far carrier end into the ring when the first arm is rotated by the tray abutment as the tray moves to its receiving-dispatching position. This crank is also spring biased toward a withdrawn, inoperative position. The carrier is thus properly positioned within the sealing ring and will positively take flight when the terminal is pressurized.

While both of the above embodiments have been useful in moving a carrier to its desired position, a further preferred embodiment is contemplated by the invention. This preferred embodiment has the significant advantage of being mounted within the terminal so that it does not protrude therefrom and present safety hazards. Additionally, however, it requires no moving parts, as do the rotary cams described above.

Accordingly, the invention contemplates an improved preferred embodiment including two stationary two-stage cams mounted within the terminal to effectively move the carrier respectively into and out of the ring. Not only are the cams stationary, avoiding the necessity of the moving parts of the rotary cams, but they can be applied to the same terminal and tray structure of the alternate embodiments above without increasing the terminal dimensions and without extending outwardly of the terminal as did the first cam of the first embodiment described.

In this preferred embodiment, a first two-stage cam is mounted within the terminal adjacent the end of the tray having the ring. The cam includes a first cam surface disposed at an angle with respect to the direction of movement of the tray. A second cam surface extends from the first cam surface at an angle greater than the first angle.

The tray ring includes a slot through which the cam passes as the tray is moved, and the two cam surfaces are disposed so that the carrier is not moved against the bumper by the cam, but axial carrier movement is limited until the carrier clears the stop. At this stage, the carrier is engaged by the second cam surface and moves outwardly of the ring. Should the carrier for some reason not be fully seated against the bumper stop, its end will first be engaged by the first cam surface, but the gentle slope of that surface is not sufficient to move the carrier against the bumper and the second cam surface is not engaged until the horizontal tray movement approximates the width of the carrier in order that the stop is cleared.

A second stationary cam is mounted within the terminal near another end of the tray and also has two cam surfaces. A first of these is disposed at ane angle with respect to the direction of tray movement while another is disposed at a second greater angle thereto. As the tray bearing a carrier is pushed inwardly, at least the second cam surface engages the carrier end to move the far end into the ring. The second cam surface is disposed so that the far end of the carrier clears or is not hindered by the second surface of the first cam as the carrier is pushed into the ring by the second cam surface of the second cam.

The two two-stage cams thus cooperate to provide between them a diagonally varying path for the carrier as the tray moves between its positions. The first cam is disposed so the carrier can clear both the stop and the second cam before it is moved out of the ring, and the second cam is disposed to insure that the carrier clears the first cam as it is moved into the ring when the tray is moved to the receiving-dispatching position.

In this embodiment, both cams are mounted completely within the terminal and cams protruding outwardly of the terminal are avoided. Further, positive movement of the carrier out of and into the sealing ring is assured without the necessity of moving cam parts.

Other objects and advantages will become readily apparent from the following description of the various embodiments of the invention and from the drawings in which:

FIG. 1 is a diagrammatical cross-sectional view of a pneumatic terminal embodying the invention;

FIG. 2 is a cross-sectional view taken along the lines 2—2 of FIG. 1;

FIG 3 is a diagrammaic view of a carrier supporting tray in its carrier receiving position FIG. 4 is a diagrammatic view similar to FIG. 3 but showing the carrier tray displaced from its carrier receiving position toward the carrier presentment position;

FIGS. 5–8 are diagrammatic plan views of a preferred embodiment of the invention;

FIG. 9 is a diagrammatic plan view of one alternate embodiment of the invention;

FIGS. 10-13 are diagrammatic plan views showing features of another alternate embodiment of the invention; and FIG. 14 is an isometric rearward view of the carrier receiving tray of the invention.

Turning now specifically to the drawings, there is shown in FIG. 1 a pneumatic terminal 10. The terminal 10 includes a sliding door 11 removably covering opening 18 a and a duct 12 operatively connected to suitable means (not shown) for pressurizing the terminal 10. A carrier receiving tray 15 is slidably mounted on bar or rod 16 which extends from a rearward wall 17 of the terminal to a forward wall 18 thereof. The tray 15 is slidably mounted with respect to the bar 16 via a mounting bracket 19, the details of which are shown in FIG. 14.

Tray 15 comprises a trough for receiving a pneumatic carrier. The tray has a relatively low forward side 20, a higher rearward side 21, and is mounted on a rod block 22 having a bore 23 therein for receiving the rod 16. One end 24 of the tray is open, but the other end is provided with a ring-like member 25 having a bottom portion 26 and an upper portion 27. The bottom and upper portions are separated by slots 28 and 29 so that the ring 25 is actually split and is not continuous. The diameter of the ring means 25 is just large enough to accommodate the typical 4¼ inch sealing gasket of a typical pneumatic carrier having sealing gaskets at both ends thereof. For purposes of description however, the combined bottom and upper portions 26 and 27 will be referred to as a ring or ring means.

As shown in FIG. 14 the upper portion 27 of the ring is mounted via a supporting member 30 to the structure which supports the tray on the sliding rod 16. This structure comprises in part an upper web 13 (to which ring portion 27 is mounted) and a lower web 14 (to which the tray 15 and lower ring portion 26 is attached). These webs are attached to the block 22 by any suitable means or can be integrally cast.

In addition to these structural features the tray supporting structure includes an axle 31 having two wheels 32, one on each end thereof, as shown in FIG. 2. The wheels 32 are disposed to ride on the flanges 33 which are mounted between the forward and rearward walls 17 and 18 of the terminal. This precludes rotation of the tray about the axis of the longitudinal rod 16.

As further shown in the drawings, the tray 15 includes a cutout portion 35 which is provided to allow the tray to slip beneath the bumper 36. The bumper is mounted to a side wall 37 of the terminal in a position to cushion and stop carriers as they are received in the tray.

In order to actuate and drive the tray, a motor means 40 is connected to the tray mounting bracket 19, as at connecting lug 41, via a flexible driving means 42. The motor means 41, together with the duct 12 and any other elements of the terminal, are located in an enclosure 45 residing just beneath the terminal floor 46.

In use, the terminal is connected to a pneumatic tube 50 of a pneumatic transport system. The tube 50 is connected to a side wall 51 of the terminal and a tube extension 52 is located within the terminal on the side wall 51. When the tray 15 is appropriately disposed in a carrier receiving or dispatching position, the ring means 25 communicates with the extension 52 in sealing relationship. Of course, a very slight opening may be left between the ring means 25 and the extension 52 so that the ring does not actually engage the projection 52. Despite this, the ring is in operative sealing relationship with the projection 52 and thus with the tube 50. The gap referred to may be several thousandths of an inch without detracting from the operation to be hereinafter described. Further, it should be understood that the lower and upper ring sections 26 and 27 have a width which is approximately equal to three times the thickness of the sealing gasket on the pneumatic carrier. Such gaskets vary in width but are typically about ⅝ inches thick.

As demonstrated in the drawings, the tray 15 is movable between two extreme positions, i.e., a rearward or inward carrier receiving-dispatching position wherein the ring 25 is aligned with the axis of the pneumatic tube and the extension 52, and a forward or outer carrier presentment position wherein the tray extends through an opening 18a in the forward side or wall 18 of the terminal.

When a carrier such as that shown at 55 is received through the pneumatic tube into the tray, it engages the bumper 36 and stops, the trailing end 56 of the carrier and at least a portion of the sealing gasket 57 thereof still being disposed within the ring 25. As the tray is moved to its outward presentment position, the carrier is moved axially within the tray so that the gasket 57 and the carrier end 56 is removed from the surrounding ring 25.

In a preferred embodiment, such as that illustrated in FIGS. 5-8 of the drawings, the carrier movement outwardly of the ring is accomplished by a stationary two-stage cam 60 mounted within the terminal 10. The stationary two-stage cam 60 has a first cam surface 61 and a second cam surface 62. The first cam surface is disposed at one angle with respect to the direction of the forward movement of the tray outwardly of the terminal. The second cam surface 62 extends from the first cam surface 61 at an even greater angle with respect to the direction of tray movement. The two surfaces 61 and 62 are joined together so as to provide a smooth, slightly curved cam surface at their intersection. Once the carrier 55 is received in the tray, the tray can be actuated via the motor means 40 (and appropriate control means) toward its outward carrier presentment position.

Movement of the carrier, however, out of the ring is precluded until the forward end 58 is in a position to clear the bumper 36. Accordingly, the cam surfaces 61 and 62 are disposed so that the carrier is not moved axially to such an extent as would bind the forward end 58 of the carrier against the bumper 36.

If the carrier 55 is in the position as shown in FIG. 5 when the tray is moved forwardly, the trailing end 56 of the carrier will not be engaged by the cam surface 61 but rather will only be engaged by the cam surface 62 at a time when the forward end of the carrier has cleared the bumper 36. If the trailing end 56 of the carrier is initially disposed closer to the extension 52, then the cam surface 61 will first engage the trailing end of the carrier. The slope of the surface 61 is slight enough, however, so that the carrier will not be moved axially in the tray such a distance as would bind the forward end 58 thereof against the bumper 36. Engagement of the trailing end 56 of the carrier with the cam surface 62 is shown in FIG. 6.

The purpose of the slots 28 and 29 also become evident in FIG. 6 where it can be seen that the cam 60 is disposed so as to fit within the slots as the carrier tray 15 and the ring 25 is moved outwardly. The elevational relationship of the two cam surfaces with respect to the forward slot 28 is also depicted in FIG. 1.

As shown in FIG. 6 the trailing end 56 of the carrier is not engaged by the cam surface 62 until the forward end 58 of the carrier has cleared the bumper 36. At this point, and upon continued outward movement of the tray through the opening 18a (door 11 now having been moved to uncover the opening) the carrier is engaged by the surface 62 and is pushed outwardly of the ring 25 so that the carrier lies in the tray in the position shown in FIG. 7; completely unencumbered by the ring 25 and in a position so as to be freely removable by a customer. Once the carrier has been removed and filled, it is replaced in the tray in the same position as when it was removed therefrom and the motor 40 is actuated by appropriate control means to return the tray to a carrier dispatching position. This movement is depicted in FIG. 8 wherein several successive positions of the carrier, as the tray is moved inwardly, are shown in phantom. The elements of successive carriers are identified by the same numbers coupled with successive letter suffixes.

During this movement a second stationary two-stage cam 65 is utilized to engage one end of the carrier and thereby move the other end of the carrier into the ring 25. Cam 65 also includes two cam surfaces 66 and 67 joined to provide a smooth curved cam surface at their intersection. The first cam surface 66 is disposed at one angle with respect to the direction of movement of the tray into the terminal, and the second cam surface 67 extends from the first cam surface 66 at a greater angle with respect to the direction of movement of the tray.

During initial movement of the tray 15 into the terminal, the end 58a of the carrier 55a first engages the first cam surface 66 of the stationary cam 65. Upon the continued forward movement of the tray and of the carrier to its position as shown in phantom at 55b, the end 58b of the carrier is engaged by a second surface 67 of the two-stage cam. As shown in FIG. 8 the forward end of the carrier in the position 55a is only engaged by the first surface 66 during initial movement of the carrier tray into the terminal. Since the slope of the surface 66 is relatively small, the carrier in the position 55a is not immediately moved at a fast rate toward the ring 25. In this manner, the end 56a of the carrier is not moved into binding engagement with the cam surface 62, for example.

Once the end 56b in the position shown at 55b has cleared the cam surface 62 the other end 58b of the carrier engages the surface 67 and the carrier is moved more forcefully into the ring 25. Specifically, the carrier is moved into the ring so that both portions 26 and 27 of the ring substantially engage the sealing gasket 57 of the carrier. Of course, the tray thereafter stops at an inward position wherein the ring 25 is axially aligned with the projection 52 and the pneumatic tube 50. At this point, appropriate control mechanisms are actuated to pressurize the terminal 10, thereby creating a greater pressure surrounding the carrier on all of its sides except for the end 56. The pressure on the end 56 being lesser than the remaining pressure on the carrier, the carrier positively takes flight through the ring 25 and the projection or extension 52 and into the tube 50. Means for evacuating the tube 50 could alternately be utilized to reduce pressure on the carrier end within the ring.

Of course, as the tray is moved inwardly the cam surface 67 engages the end 58 of the carrier and moves it into the ring so that the end 58 does not bind against the bumper 36 as the tray is moved to its final dispatching position. Further, a carrier sensing switch 68 is provided in the carrier path for detecting the presence of a carrier on the tray and closing an appropriate circuit in the control system to indicate that a carrier is present when the tray is retracted. In the event that no carrier is placed in the tray, the system will not be activated and the tray can be returned to its desired position without the necessity of performing any operating cycle.

In an alternate embodiment shown in FIG. 9, the terminal is unchanged with the exception of the means for moving the carrier out of and into the ring 25 in response to movement of the tray outwardly of the terminal and inwardly of the terminal, respectively. Specifically, a first cam 70 is mounted on the outside of the terminal. The cam includes a cam surface 71 disposed to fit through the slot 28 to engage the carrier end 56 and move the carrier out of the ring as the tray is moved to its outward presentment position. The path of the end 56 of the carrier is illustrated by the phantom line 72.

Once the carrier has been removed from the tray and filled it is replaced thereon and the tray is actuated to return to a carrier dispatching position. In order to place the sealing gasket of the carrier within the ring so that the carrier is effectively sealed to the pneumatic tube, a second cam 73 is mounted within the terminal 10. The second cam 73 includes a cam surface 74 disposed to engage the end 58 of a carrier and to thus slide the carrier axially so that the other end 56 is moved into the ring 25. The movement of the end 58 of the carrier is depicted in the path shown by the phantom line 75 of FIG. 9.

A still further embodiment is depicted in FIGS. 10—13. The terminal of this embodiment is essentially the same as the terminal described with respect to the first two embodiments and thus the same identifying numerals will be used to identify identical features thereof. This embodiment differs from the first two embodiments in that stationary cams are not utilized to move the carrier out of and into the ring. Instead, spring loaded rotatable cams are engaged by projections on the carrier tray and are thereby actuated to engage and move the carrier in a desired manner in response to tray movement.

Referring to FIG. 10, a first rotatable cam 80 is disclosed. Cam 80 essentially comprises a bellcrank having a first crank arm 81 and a second crank arm 82. The cam 80 is pivoted to bracket 83 mounted on terminal wall 51 and a spring 84 is mounted to bias the cam in a clockwise direction, as shown in FIG. 10. As also shown in FIG. 10, the crank arm 81 has a relatively curved surface 85 which blends into the arm 82. Also, arm 82 is provided with a roller 86 on the end thereof. The tray 15 is provided with a roller member 87 mounted at the ring end of the tray 15 in a position to engage the surface 85 of the crank arm 81 as the tray is moved outwardly.

In operation, and once the carrier is received, the tray 15 is moved toward the opening 13 to present the carrier thereon. During this movement, the bias of spring 84 rotates the cam 80 in a clockwise direction, the arm 82 riding on the roller 87 of the tray. Once the roller 87 of the tray engages the surface 85, the cam is further positively pivoted by the roller 87, in response to movement of the tray, so that the roller 86 engages the carrier end 56 and pushes the carrier 55 out of the ring 25. Of course, the ring 25 is slotted as with the previous embodiments and the cam 80 is relatively thin and is disposed to fit within the slots as the tray is moved outwardly. Upon return of the tray 15 to a carrier dispatching position, the roller 87 engages the arm 82 and rotates the cam 80, against the bias of spring 84, back into the position shown in FIG. 10.

In order to insert a carrier into the ring in response to movement of the tray 15 back into the terminal toward a carrier dispatching position, this embodiment includes a second rotatable cam 90 as shown at FIGS. 12 and 13. The cam 90 is located just under a bumper 91 which is mounted on the side wall 37 of the terminal. The cam 90 is constructed from a one-piece member 92 that functions in the same manner as a bellcrank. The cam is pivoted at 93 to the terminal and is spring biased by the spring 94 in a counterclockwise direction toward the position shown in FIG. 12. The cam includes a carrier engaging roller 95 and an actuating roller 96, the roller 96 being positioned within the path of an abutment 97 mounted on the tray 15. As the tray is moved inwardly, the abutment 97 engages the roller 96 and rotates the bracket 92 in a clockwise direction. Upon this movement, the roller 95 is rotated into a position to engage the end 58 of the carrier. Continued movement of the tray into the terminal causes continued rotation of the cam and the roller 95 thus pushes the carrier so that the other end of the carrier (not shown) is inserted into the ring. Movement of the carrier by the cam 90 is depicted in FIG. 13.

Once the tray 15 has reached the carrier dispatching position as indicated in FIG. 13, the abutment member 97 still engages the roller 96 and holds the cam in the position shown in FIG. 13 against the bias of the spring 94. Thus, the roller 95 is held out of the way of any carrier which is subsequently received in the tray, and thrust against the bumper.

It can thus be appreciated that the invention has provided unique means whereby a carrier can be positively positioned in a sealing relationship with respect to a pneumatic tube so that the carrier will positively take flight when, for example, the terminal in which it is located is pressurized. Further, and upon presentment, the carrier, by means of the various alternate embodiments of the invention, is removed from the sealing ring and is unencumbered for easy removal by a customer. It should also be noted that in the normally contemplated operation, the customer will not have to reach his hand into the terminal. Danger of injury is thereby substantially reduced, while at the same time positive operation of the carrier transportation system is assured.

These and other modifications and alterations will become readily apparent to those of ordinary skill in the art without departing from the scope of this invention and the applicants intend to be bound only by the appended claims.

We claim:
1. A pneumatic terminal comprising:
 a chamber,
 a pneumatic tube having an outlet operably connected to the chamber for the respective introduction and receipt of pneumatic carriers to or from within the chamber,
 a carrier supporting tray mounted within the chamber for movement between a carrier receiving-dispatching position, wherein one end of the tray is operably aligned with said tube outlet, and a carrier presentment position wherein said tray is moved away from said outlet,
 a carrier surrounding ring means, mounted on said one end of said tray, for providing an operative seal between one end of a pneumatic carrier and said tube outlet, said ring means being aligned with said outlet when said tray is in its carrier receiving-dispatching position so that a carrier can move through said ring means into said tube, and
 said terminal being adapted to be pressurized to a pressure greater than the pressure within the pneumatic tube so that a carrier can be conveyed from said terminal through said ring, said outlet and said tube,
 cam means for moving a carrier axially with respect to said ring means said cam means including,
 a first cam positioned within said terminal at least adjacent a path traversed by said ring means, as said tray moves from its receiving-dispatching position toward its presentment position, said first cam engaging said carrier within said terminal and moving it outwardly of said ring in response to said tray movement toward said presentment position, and
 a second cam positioned within said terminal at least adjacent a path traversed by another end of said tray as said tray moves from its presentment position toward its receiving-dispatching position, said second cam engaging said carrier within said terminal and moving it into sealing relationship within said ring in response to movement of said tray toward said receiving-dispatching position.

2. A terminal as in claim 1 further including a carrier stop means, said stop means being mounted adjacent said other end of said tray and operatively aligned therewith, when said tray is in its receiving-dispatching position, for stopping carriers conveyed through said tube and outlet into said tray, said ring surrounding one end of said carrier when it has been stopped.

3. A terminal as in claim 2 wherein said second cam is disposed to move said carrier axially into said ring a distance sufficient to avoid carrier contact with said stop means upon movement of said tray toward said receiving-dispatching position.

4. A terminal as in claim 2 wherein said first cam is disposed so as to avoid carrier movement outwardly of said ring until said other end of said tray and said carrier clear said stop means.

5. A terminal as in claim 1 wherein said ring is coaxial with said outlet and wherein said carrier is of the type having a sealing gasket on at least one end thereof, said ring having a surface width sufficient to extend from a sealing relationship with said outlet, on one side of said ring, to operatively surround said sealing gasket when said tray is in its receiving-dispatching position.

6. A terminal as in claim 1 wherein said tray has a longitudinal axis which aligns with the center of said outlet when said tray is in its receiving-dispatching position, and wherein movement of said tray to said presentment position is in a direction normal to said axis.

7. A terminal as in claim 1 wherein said outlet is disposed to introduce carriers into said terminal in horizontal disposition, said tray receiving said carriers horizontally and being mounted for horizontal movement between said receiving-dispatching and said presentment position.

8. A terminal as in claim 1 wherein said first and second cams each include two cam surfaces and wherein a first one of said surfaces is disposed at a first angle with respect to the direction of movement of the tray, and a second one of said surfaces is disposed at a greater angle with respect to the direction of movement of said tray.

9. A terminal as in claim 8 wherein said first and second cams are disposed near respective opposite ends of said tray, and including a stop means near one of said ends, and adjacent said second cam, for stopping said carrier upon receipt thereof in said tray, said second surface of said first cam being disposed to contact one end of a carrier, as the tray moves toward its presentment position, after another end of the carrier has cleared said stop.

10. A terminal as in claim 9 wherein said second cam surface of said second cam is disposed to engage the other end of the carrier and move the carrier into said ring, when said tray is moved toward its receiving-dispatching position, without pressing said one end of said carrier against the first cam surface of said first cam.

11. A terminal as in claim 1 wherein said ring means is slotted and wherein an operative portion of said first cam is mounted to extend through said slot to engage said carrier and move it outwardly of said ring.

12. A terminal as in claim 1 wherein said first and second cams are pivoted cams, each having a tray engaging means and a carrier engaging means for moving said carrier when pivoted by the tray.

13. A terminal as in claim 1 wherein said first cam comprises a bell crank pivoted adjacent said one end of said tray and within said terminal and having one arm means for engaging said tray when said tray is moved outwardly toward a presentment position and another arm means for engaging and moving said carrier outwardly of said ring means when pivoted by said outwardly moving tray.

14. A terminal as in claim 13 wherein said second cam comprises a bell crank pivoted within said terminal adjacent said other end of said tray and having one arm means for engaging said tray when said tray is moved inwardly toward its receiving-dispatching position, and another arm means for engaging and moving said carrier into said ring when pivoted by said inwardly moving tray.

15. A terminal as in claim 14 further including a roller means mounted on said tray for engaging said one arm means on said first cam, said one arm means providing a curved roller engaging surface, and said other arm means on said first cam having a roller on an end for engaging a carrier.

16. A terminal as in claim 15 wherein said first cam further comprises spring means for biasing said cam toward an extended position wherein said roller on said other arm means is biased toward a carrier.

17. A terminal as in claim 16 wherein said second cam includes a first roller mounted on said one arm means of said second cam, said tray including abutment means for engaging said first roller and pivoting said second arm.

18. A terminal as in claim 17 wherein said second cam further includes a second roller on said other arm means of said second cam for engaging a carrier, said second cam being spring biased toward an inoperative position wherein said first roller is disposed within a path traversed by said abutment means as said tray is moved and said second roller is withdrawn from engagement with a carrier.

19. A pneumatic transport apparatus comprising:
a terminal,
a pneumatic tube connected to the terminal at a tube outlet within the terminal,
a movable tray which in one position within the terminal is aligned with the outlet for receiving a carrier from the tube and for operatively positioning a carrier for dispatch,
a ring means at one end of the tray near the outlet for surrounding one end of the carrier and for providing a seal between the carrier and the outlet to insure movement of the carrier into the tube when the terminal is pressurized, and
means for respectively disengaging and inserting a carrier from and into said ring means in direct response to respective movement of the tray said disengaging and inserting means comprising two respective cams, each pivotally mounted within the terminal and each having a tray engaging arm and a carrier engaging arm, the cams being respectively pivoted near opposite ends of the tray and positioned to engage the tray and to engage and move the carrier respectively out of or into said ring in response to respective movement of the tray from said one position to said presentment position and from said presentment positiion to said one position.

20. A pneumatic transport apparatus comprising:
a terminal,
a pneumatic tube connected to the terminal at a tube outlet within the terminal,
a movable tray which in one position within the terminal is aligned with the outlet for receiving a carrier from the tube and for operatively positioning a carrier for dispatch,
a ring means at one end of the tray near the outlet for surrounding one end of the carrier and for providing a seal between the carrier and the outlet to insure movement of the carrier into the tube within the terminal is pressurized, and
means for respectively disengaging and inserting a carrier from and into said ring means in direct response to respective movement of the tray, said disengaging and inserting means comprising two respective stationary cam elements, each mounted within the terminal near respective ends of the tray and each comprising a first cam surface disposed at one angle with respect to the direction of movement of the tray, and a second cam surface disposed at another greater angle with respect to the direction of movement of said tray, a first one of said cam elements adapted to move said carrier outwardly of said ring means in response to movement of said tray from said one position to a carrier presentment position outwardly of the terminal, and a second one of said cam elements adapted to move said carrier into said ring in response to movement of said tray from said presentment position to said one position within the terminal.

21. Apparatus as in claim 20 wherein the second cam surfaces of each cam element are disposed to engage a carrier on the tray when the tray is at a point intermediate the respective positions of the tray as the tray is moved from one respective position to the other.

22. Apparatus as in claim 20 including a stop means mounted within the terminal near another end of the tray for stopping carriers received from the tube, the second cam surface of a first cam element near the one end of the tray which includes said ring being disposed to engage one end of and move a carrier after said tray has moved to a point such that the other end of the carrier has cleared said stop means.

23. A pneumatic terminal for use in a pneumatic carrier transport system of the type having means to establish a pressure differential across opposite ends of a pneumatic carrier to propel said carrier through a pneumatic tube, said terminal comprising:
- a movable tray means for receiving and supporting pneumatic carriers introduced into said terminal through a pneumatic tube operably connected to the terminal at a tube outlet,
- said tray means including a ring at one end of said tray means, said ring being operably aligned with said pneumatic tube, when said tray means is in a first position, and being disposed to surround one end of a pneumatic carrier received in said tray means so as to provide a seal between said carrier and said tube,
- first cam means within said terminal for moving said carrier axially in said tray and away from said ring in response to movement of said tray toward a second position, where said carrier is presented for extraction from said terminal, and
- second cam means within said terminal for moving a carrier axially in said tray and into said ring in response to movement of said tray from its second to its first position,
- said ring operatively sealing one end of said carrier to an end of said pneumatic tube such that carriers are introduced through the ring into said tube when said tray is in said first position and when the pressure in said tube is less than the pressure in said terminal.

24. A pneumatic terminal comprising:
- a chamber,
- a pneumatic tube having an outlet operably connected to the chamber for the respective introduction and receipt of pneumatic carriers to or from within the chamber,
- a carrier supporting tray mounted within the chamber for movement between an inward carrier receiving-dispatching position, wherein one end of the tray is operably aligned with said tube outlet, and an outward carrier presentment position wherein said tray is moved away from said outlet,
- a carrier surrounding ring means mounted on said one end of said tray for providing an operative seal between one end of a pneumatic carrier and said tube outlet, said ring means being aligned with said outlet when said tray is in its carrier receiving-dispatching position so that a carrier can move through said ring means into said tube,
- first cam means for moving a carrier axially and outwardly of said ring means when said tray is moved toward its presentment position, said first cam means comprising a bell crank pivoted adjacent said one end of said tray and within said terminal and having one arm means for engaging said tray when said tray is moved outwardly toward its presentment position and another arm means for engaging and moving said carrier outwardly of said ring means when pivoted by said outwardly moving tray, and
- second cam means for moving a carrier axially on said tray and into sealing engagement within said ring when said tray is moved from its presentment position toward said receiving-dispatching position, said second cam means comprising a bell crank pivoted within said terminal adjacent another end of said tray and having one arm means for engaging said tray when said tray is moved inwardly toward its receiving-dispatching position, and another arm means for engaging and moving said carrier into said ring when pivoted by said inwardly moving tray.

25. A pneumatic terminal for use in a pneumatic carrier transport system having means to establish a pressure differential across opposite ends of a pneumatic article carrier to propel said carrier through a pneumatic tube as when said terminal is pressurized, said terminal comprising:
- a chamber,
- a pneumatic tube having an outlet operably connected to the chamber for the respective introduction and receipt of pneumatic carriers to or from within the chamber,
- a carrier supporting tray mounted within the chamber for movement between an inward carrier receiving-dispatching position, wherein one end of the tray is operably aligned with said tube outlet, and an outward carrier presentment position wherein said tray is moved away from said outlet,
- a carrier surrounding ring means mounted on said one end of said tray for providing an operative seal between one end of a pneumatic carrier and said tube outlet, said ring means being aligned with said outlet when said tray is in its carrier receiving-dispatching position so that a carrier can move through said ring means into said tube,
- first stationary cam means, mounted within said terminal near said one end of said tray, for moving a carrier axially and outwardly of said ring means when said tray is moved from its receiving-dispatching position toward its presentment position, said first cam means comprising a first and a second cam surface, said first cam surface disposed at one angle with respect to the direction of tray movement and said second cam surface disposed at a second greater angle with respect to said direction of tray movement, said carrier engaging at least one of said surfaces and moving outwardly of said ring means in direct response to outward movement of the carrier by said tray,
- second stationary cam means, mounted within said terminal near another end of said tray, for moving a carrier axially on said tray and into sealing engagement within said ring when said tray is moved friom its presentment position toward said receiving-dispatching position, said second cam means also comprising a first and a second cam surface, wherein the first cam surface of said second cam means is disposed at one angle with respect to the direction of tray movement, and wherein the second cam surface of said second cam means disposed at a second greater angle with respect to said direction of tray movement, said carrier engaging at least one of said surfaces on said second cam means, and moving into said ring in direct response to inward movement of said carrier by said tray.

26. A terminal as in claim 25 wherein said ring is slotted, said first cam means passing through said slot to engage a carrier when the tray is moved toward its presentment position.

27. A terminal as in claim 25 wherein said first and second cam surfaces of each of said first and second cam means are respectively mounted and disposed to allow respective movement of a carrier by the surfaces of the other cam means.

28. A terminal as in claim 27 including a stop means mounted adjacent said other end of the tray for stopping carriers received on said tray from said tube, said first and second cam surfaces of said first cam means disposed to engage and move received carrier after it has cleared said stop means.

29. A terminal as in claim 25 wherein said first and second cam surfaces, of each cam means, from a single, variable angle cam surface, each of said first and second surfaces being substantially linear and being joined by a curved cam surface.

30. A pneumatic terminal for use in a pneumatic carrier transport system having means to establish a pressure differential across opposite ends of a pneumatic article carrier to propel said carrier through a pneumatic tube, said terminal comprising:

movable tray means for receiving and supporting pneumatic carriers introduced into said terminal through a pneumatic tube operably connected to the terminal at a tube outlet, said tray means including a ring at one end of said tray means, said ring being operably aligned with said pneumatic tube, when said tray means is in a first position, and being disposed to surround one end of a pneumatic carrier received in said tray means so as to provide an operative seal between said carrier and said tube, first stationary cam means within said terminal for moving said carrier axially in said tray and away from said ring in response to movement of said tray toward a second position, where said carrier is presented for extraction from said terminal, and second stationary cam means within said terminal for moving a carrier axially in said tray and into said ring in response to movement of said tray from its second to its first position, said ring operaively sealing one end of said carrier to an end of said pneumatic tube such that carriers are introduced thrugh the ring into said tube when said tray is in said first position and when the pressure in said tube is less than the pressure in said terminal.

* * * * *

UNITED STATES PATENT AND TRADEMARK OFFICE
CERTIFICATE OF CORRECTION

PATENT NO. : 3,948,466
DATED : April 6, 1976
INVENTOR(S) : Joel Rudder et al

It is certified that error appears in the above-identified patent and that said Letters Patent are hereby corrected as shown below:

Column 4, line 24, insert --cam-- between "second" and "surface".

Column 4, line 48, "diagrammaic" should be --diagrammatic--.

Column 14, line 7, Claim 25, insert --such-- between "tube" and "as".

Signed and Sealed this

Twelfth Day of April 1977

[SEAL]

Attest:

RUTH C. MASON
Attesting Officer

C. MARSHALL DANN
Commissioner of Patents and Trademarks